May 20, 1941.　　R. M. RANEY　　2,242,599

STORAGE BATTERY

Filed Aug. 1, 1939

INVENTOR.

BY ROBERT M. RANEY

Kwis Hudson & Kent

ATTORNEYS

Patented May 20, 1941

2,242,599

UNITED STATES PATENT OFFICE 2,242,599

STORAGE BATTERY

Robert M. Raney, Euclid, Ohio, assignor to Willard Storage Battery Company, Cleveland, Ohio, a corporation of West Virginia Application August 1, 1939, Serial No. 287,765

2 Claims. (Cl. 136—168)

This invention relates to storage batteries and has particular reference to batteries wherein the terminal posts are sealed against leakage of electrolyte by lead sealing sleeves which are molded in the covers and are subsequently lead-burned to the posts and generally in the case of cross-connectors are also lead-burned to the latter.

The principal object of the invention is to provide certain improvements which facilitate the assembly particularly of the covers onto the posts and which, after the assembling and lead-burning operations are completed, provide an improved battery construction from the standpoint of the efficiency of the welded or fused joint between the sleeve and the post or between the sleeve, the post, and the connector.

A still further object is to so form the lead insert of the cover that when the upper ends of the insert and the post are lead-burned together clearance is provided between the post and the sleeve below the portions which are welded together so as to admit of a certain flexing of the post relative to the insert as has been found desirable under certain circumstances.

The above objects are attained in my improved battery construction by the use of a lead insert having a post opening in the form of a truncated cone but which accommodates a substantially cylindrical terminal post, the opening at its upper end where it is designed to be lead-burned to the post being only slightly larger than the post but below the welded or lead-burned joint gradually enlarging so as to provide a constantly increasing clearance for the post throughout the remainder and in fact the greater portion of the length of the insert.

The invention may be further briefly summarized as consisting in certain novel details of construction and combinations and arrangements of parts which will be described in the specification and set forth in the appended claims.

Figure 1:
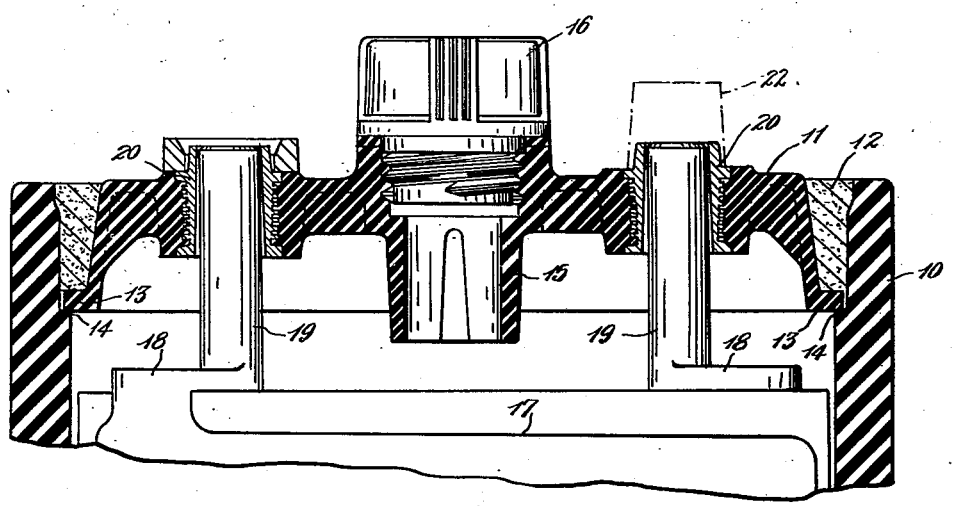
Figure 2:
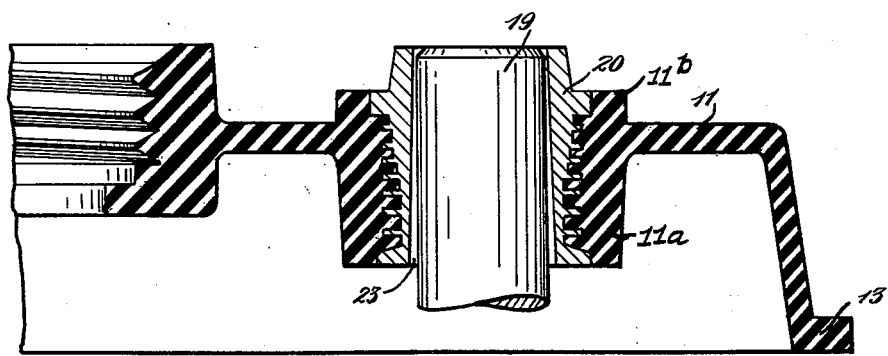
Figure 3:
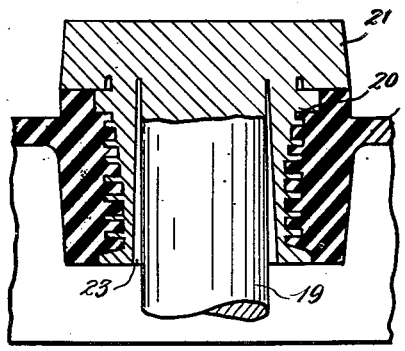
Figure 4:
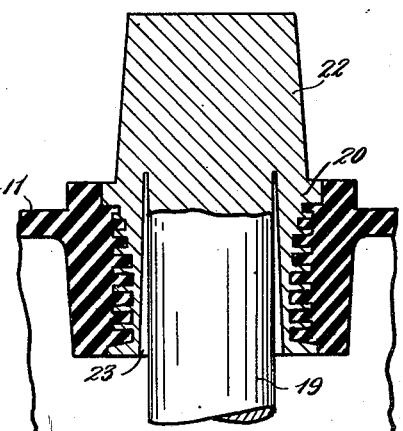

In the accompanying sheet of drawing,

Fig. 1 is a vertical sectional view through the upper part of a cell of a battery constructed in accordance with my invention, the posts and the lead sealing sleeves being shown before they are lead-burned together;

Fig. 2 is an enlarged fragmentary sectional view showing one of the posts and the sealing sleeve before the lead-burning operation; and Figs. 3 and 4 are similar views after the lead-burning operation, Fig. 3 showing the post and sealing sleeve lead-burned to a cross-connector, and Fig. 4 shows the tapered extension which is built up during the lead-burning operation to accommodate a terminal clamp.

Referring now to the drawing, 10 represents the battery case (only the two opposite side walls thereof being shown), and 11 represents the cell cover which is fitted down into the top of the cell compartment of the case 10 and sealed therein by the usual sealing compound 12. The case 10 and the cover 11 may be molded of any suitable material, such as rubber, inert to the electrolyte of the battery. In this instance, the marginal flange 13 at the lower end of the skirt portion of the cover is seated upon shoulders 14 formed on the inner walls of the case 10. The underside of the cover has a slotted skirt 15 in line with an internally threaded opening to accommodate a vent plug 16, but these parts or features of the cover are immaterial to the present invention and need not be further considered.

In the cell compartment is located the battery element which is designated as a whole by the reference character 17 and which includes the positive plates, the negative plates, and the intervening separators, the two groups of plates being united in the usual manner to straps 18 provided with upstanding terminal posts 19 which in this instance are cylindrical or substantially cylindrical in shape throughout their length, any taper incident to molding being material. These posts extend up through openings which are provided in lead-sealing sleeves 20 which are molded in the cover. When the cover 11 is lowered over the posts to its normal position with the flange 13 resting on the shoulders 14, the upper ends of the posts coincide substantially with the upper ends of the sealing sleeves 20. The sleeves are preferably flanged externally so that they will have a good anchorage in the cover and are of sufficient length to obtain the desired anchorage, and in this instance extend downwardly along the posts for substantially one-half the length of the latter although the length of the sleeves with relation to the total length of the posts may vary considerably in different types of batteries. It will be noted that the lead sealing sleeves 20 are molded and securely anchored in thickened portions of the cover, each thickened portion being formed principally by a boss 11a molded on the underside of the cover, there being in this instance a flange 11b molded on the upper side of the cover and forming in effect a continuation of the boss 11a. Each sleeve 20 extends from the lower end of the boss 11a to a point slightly above the flange 11b, as most clearly shown in Figs. 1 and 2.

In Fig. 2 I have shown on an enlarged scale the relative arrangement of one of the sealing sleeves and the associated post prior to the burning operation, and in Figs. 3 and 4 are shown the posts and sleeves after the upper ends of the posts have been lead-burned to the upper ends of the sleeves. In Fig. 3 the posts and sleeves are also lead-burned to an intercell or cross-connector 21 while in Fig. 4 is shown the companion post lead-burned to its associated sealing sleeve and built up in the usual manner to provide a tapered extension 22 adapted to accommodate a terminal clamp. I might say that the posts 19 and the sleeves 20 are preferably formed of lead. Generally a small amount of antimony is alloyed with the lead but the percentage of antimony is low to keep down the manufacturing cost and also to provide a certain amount of flexibility particularly in the posts as is desirable for reasons to be explained presently.

It is to be noted that when the cover is inserted the full distance in the cell compartment with its lower marginal flange resting on the shoulders or ledges 14 of the compartment walls, the upper end of the post is at the upper end of the associated sealing sleeve 20. Likewise, it will be noted that the upper end of the post is separated from the upper end of the sleeve by a very slight clearance and that the clearance greatly increases from the upper end of the sleeve to its lower end. This is accomplished by making the post opening 23 of the sleeve in the form of a truncated cone. The opening 23 may be molded in its truncated shape or it may be molded in substantially cylindrical form and converted to truncated cone shape by a tapered reamer run through the sleeve from its lower end. It is desirable that the taper of the opening 23 be such as to provide a clearance between the lower end of the sleeve and the post which is several times the clearance between the upper end of the sleeve and the post prior to the lead-burning operation.

Tapered post openings in lead sealing sleeves have been used heretofore, but so far as I am aware they have always been used in association with correspondingly tapered posts so that when the cover is fitted into the top of the compartment the posts and the sleeves will engage each other for substantially the full length of the sleeves. So far as I know, it is new with me to utilize a sleeve with a tapered post opening wider at the bottom than at the top in association with a post which is cylindrical or substantially cylindrical in shape so as to provide a gradually increasing clearance between the sleeve and the post from the point where they are lead-burned together to the lower end of the sleeve. This construction has numerous advantages over the constructions utilized heretofore, and these will now be pointed out.

This construction facilitates the assembly of the cover into the top of the cell because the relatively large opening at the bottom of the sleeve admits of the cover being lowered down to its normal or intended position on the shoulders 14 notwithstanding the fact that the axes of the posts may be somewhat out of parallelism with each other by reason of the fact that one or both are slightly bent from normal position and notwithstanding slight irregularities which may be on the surface of the post. In prior constructions it was often the case that irregularities on the post or a bent post prevented the cover from being lowered the intended distance into the top of the cell compartment, and in this instance down onto the cover supporting shoulders or ledges 14. In other words, a relatively large opening is provided at the bottom of the sleeve with the attendant advantage of facilitating assembly while at the same time a very slight clearance is provided between the top of the sleeve and the post which is desirable for the reason that it permits the use of a thicker wall in the top portion of the sleeve than would otherwise be the case without increasing the external diameter of the upper part of the sleeve. This provides increased strength after the lead-burning operation and increased resistance to twisting stresses. This is of material advantage for the reason that when a terminal is being removed from a post it is customary for the operator or repairman to twist the terminal clamp to release it, thus subjecting the weld between the post and the sleeve to severe torsional stresses.

A further important advantage of the present invention lies in the fact that the post is capable of flexing throughout substantially its entire length since it is united to the sleeve at its upper end only and from its upper end to the lower end of the sleeve is separated from the latter by a gradually increasing clearance. This ability of the post to flex is important in that it permits of some lateral movement of the battery element 17 during the aging of the battery in service. This movement is likely to occur as the result of growing of the positive plates due to sulphation. If the strap and the post are free to move laterally as stated above, some of the lateral pressure exerted by the plates during the growing process is expended in bending the post since the insert is tapered in such a manner that the post may bend throughout almost its entire length, with the result that less damage to the plates will occur because of the sulphation and plate growth.

While I have shown the preferred construction, I do not desire to be confined to the precise details shown but aim in my claims to cover all modifications which do not involve a departure from the spirit and scope of the invention.

Having thus described my invention, I claim:

1. A storage battery having a cell compartment, a cover therefor, and a battery element in the compartment with a post extending through the cover, the cover having a thickened portion and having a metal sealing sleeve molded and anchored in said thickened portion for the major portion of the length of the sleeve, the sleeve being provided with a post opening in the form of a truncated cone and the upper end of the sleeve being lead-burned to the post, the portion of the post extending between the part thereof which is lead-burned to the sleeve and the lower end of the sleeve being surrounded by and spaced from the inner tapered wall of the sleeve with a gradually increasing clearance extending to the lower end of the sleeve and entirely around the post.

2. A storage battery having a cell compartment, a cover therefor, and a battery element in the compartment with posts extending through the cover, the cover having thickened portions formed principally by bosses molded on the underside of the cover, metal sealing sleeves molded and anchored for substantially their entire length in said thickened portions of the cover, each of the sleeves being provided with an opening through which one of the posts extends with the upper end of the sleeve lead-burned to the upper end of the corresponding post, said opening of the sleeve being in the form of a truncated cone with the inner tapered wall of each sleeve from the upper part to the lower end thereof surrounding the portion of the post extending therethrough with a gradually increasing clearance extending to the lower end of the sleeve entirely around the post.

ROBERT M. RANEY.